United States Patent
Krayden et al.

(10) Patent No.: US 11,496,395 B2
(45) Date of Patent: Nov. 8, 2022

(54) METHOD FOR IMPLEMENTING A CONSISTENT HASHING IN A COMMUNICATION NETWORK

(71) Applicant: DRIVENETS LTD., Raanana (IL)

(72) Inventors: Amir Krayden, Hertzelia (IL); Yuval Lev, Gan Yavne (IL); Evgeny Sandler, Herzliya (IL); Alexander Zilberman, Hadera (IL)

(73) Assignee: DRIVENETS LTD., Raanana (IL)

( * ) Notice: Subject to any disclaimer, the term of this patent is extended or adjusted under 35 U.S.C. 154(b) by 25 days.

(21) Appl. No.: 17/151,882

(22) Filed: Jan. 19, 2021

(65) Prior Publication Data

US 2022/0231947 A1 Jul. 21, 2022

(51) Int. Cl.
*H04L 45/7453* (2022.01)
*H04L 45/745* (2022.01)
(Continued)

(52) U.S. Cl.
CPC ........ *H04L 45/7453* (2013.01); *H04L 45/748* (2013.01); *H04L 45/74591* (2022.05); *H04L 69/22* (2013.01)

(58) Field of Classification Search
None
See application file for complete search history.

(56) References Cited

U.S. PATENT DOCUMENTS

2013/0235192 A1* 9/2013 Quinn .................. G08B 29/16
 348/143
2013/0268644 A1 10/2013 Hardin et al.
(Continued)

FOREIGN PATENT DOCUMENTS

EP 1876788 A 1/2008

OTHER PUBLICATIONS

Maenpaa Ericsson A Swaminathan S Das Qualcomm J et al. "A Topology Plug-in for Resource Location And Discovery" draft-maenpaa-p2psip-topologyplugin-00.txt, Internet Engineering Task Force, IETF; Standardworkingdraft, Internet Societty (ISOC)4, Rue Des Falaises CH-1205 Geneva, Switzerland, Jul. 6, 2009, XP015063125.

(Continued)

*Primary Examiner* — Xavier S Wong
(74) *Attorney, Agent, or Firm* — Browdy and Neimark, PLLC

(57) ABSTRACT

A method for use in a communication network is provided. The method comprises the steps of: (i) providing a plurality of network processing units (NPU's) comprised in the communication network; (ii) establishing a replication of at least one of the NPU's; (iii) virtually arranging the NPU's and the replication(s) in a ring configuration; (iv) associating a unique primary virtual identification and a corresponding unique backup virtual identification with each active and available entity selected from among the plurality of NPU's and replication(s); (v) establishing a list of hash values, each associated with the primary virtual identification or the backup virtual identification of a corresponding active and available entity; (vi) implementing a ring consistent hashing algorithm for carrying out a search resolution for a consistent hashing; and (vii) in a case of a change in an active and available entity having a certain primary virtual identification, using the corresponding backup virtual identification to maintain the ring continuity.

7 Claims, 5 Drawing Sheets

(51) Int. Cl.
*H04L 45/748* (2022.01)
*H04L 69/22* (2022.01)

(56) References Cited

U.S. PATENT DOCUMENTS

2014/0153575 A1* 6/2014 Munoz .................... H04L 67/28
370/392
2017/0177266 A1* 6/2017 Doerner ................ G06F 3/0689
2018/0270153 A1 9/2018 Singh et al.
2021/0344596 A1* 11/2021 Mittelman .............. H04L 69/22

OTHER PUBLICATIONS

Ion Stoica et al "Chord", Computer Communication Review, ACM, New York, NY, US, vol. 31, No. 4, 27, Aug. 27, 2001, pp. 149-160 XP058178055.

* cited by examiner

METHOD FOR IMPLEMENTING A CONSISTENT HASHING IN A COMMUNICATION NETWORK

TECHNICAL FIELD

The present disclosure generally relates to the field of communication systems. More particularly, the present disclosure relates to systems implementing infrastructure for multiservice routing, virtual network function virtualization and software-defined networking.

Glossary

ECMP—Equal Cost Multi-Path.
EPC—Evolved Packet Core.
FRR—Fast Re-Route.
LPM—Longest Prefix Match.
NAT—Network Address Translation.
NCP—Network Cloud Packet Forwarder.
NPU—Network Processing Unit.
TCAM—Ternary Content-Addressable Memory.
WCMP—Weighted Cost Multi-Path.
VRF—Virtual Routing and Forwarding.

BACKGROUND

High-scale stateful load balancing is an important part of many network functions and an active field of academic and practical research. The use of load balancing is part of many different layers in networking functionalities, including but not limited to: Link-aggregation traffic distribution, ECMP/WCMP (Equal Cost Multi-Path, Weighted Cost Multi-Path), L4-L7 Session Load Balancing, Distributed Data-base implementation, Mobility EPC (Evolved Packet Core) functions, NAT (Network Address Translations) functions, and the like.

Classical non stateful (Link-aggregation, ECMP/ECMP) or stateful (L4-L7 Session Load Balancing, etc.) are all revolving around the way to choose the destination or eventual server/micro-service which should handle a traffic item. The way in which the existing destinations are obtained, managed, accounted for or being classified are beyond the scope of this disclosure, so are the exact ways by which load parameters/abilities of these destinations are conveyed to the load balancing device/devices (which can be based on out-of-band communication or in-band communication using special streams or piggi-bagging existing ones, where problems are more complicated in case of a distributed load-balancing architecture).

SUMMARY

The disclosure may be summarized by referring to the appended claims.

It is an object of the present disclosure to provide a novel and improved method that allows affecting changes in a communication network comprising a plurality of network processing units and/or clusters thereof, while adding/removing/overcoming a failure of a network processing unit.

It is another object of the present disclosure to provide a novel method that enables obtaining an improved load balancing performance.

It is another object of the present disclosure to provide a novel method that enables obtaining an improved scaling up of existing networks that comprise a vast number of network processing units.

It is yet another object of the present disclosure to provide a novel and improved method for utilizing different load-balancing groups in conveying communications in a communication network.

Other objects of the present disclosure will become apparent from the following description.

According to a first embodiment of the present disclosure there is provided a method for use in a communication network, wherein the method comprises the steps of:
(i) providing a plurality of network processing units (NPU's) comprised in the communication network;
(ii) establishing a replication of at least one of that plurality of network processing units;
(iii) virtually arranging the plurality of network processing units and the at least one replication, in a ring configuration;
(iv) associating a unique primary virtual identification and a corresponding unique backup virtual identification with each active and available entity selected from among the plurality of network processing units and the at least one replication;
(v) establishing a list of hash values, each associated with the primary virtual identification or with the backup virtual identification of a corresponding active and available entity;
(vi) implementing a ring consistent hashing algorithm for carrying out a search resolution for a consistent hashing (e.g., by using an arbitrary key K); and
(vii) in a case of a change (i.e., adding/removing/failure) in at least one of the active and available entities having a respective unique primary virtual identification, using the corresponding backup virtual identification to maintain the ring continuity.

By yet another embodiment, the search resolution for a consistent hashing is conducted based on searching for a packet destination ID using a key built from said packet's meta-data. Optionally, the packet's meta-data is derived from the packet's networking headers.

According to still another embodiment, the search resolution for a consistent hashing is done by retrieving a respective destination ID while using a Ternary Content-Addressable Memory (TCAM) algorithm.

In accordance with another embodiment, the method provided further comprises a step of composing a route space of the networking subnets and/or prefixes, and wherein the search function is based on a Longest Prefix Match (LPM) algorithm.

According to yet another embodiment, the same search function (LPM) is preserved, and the space is built by using possible virtual identifications as prefixes.

By still another embodiment of the present disclosure, the method provided further comprises a step of utilizing different load-balancing groups as VRF (Virtual Routing and Forwarding) tables, which in turn are used as a parameter while carrying out the LPM algorithm search, thereby generating a dedicated consistent hashing space for use as a route space for conveying traffic in the communication network.

BRIEF DESCRIPTION OF THE DRAWINGS

The accompanying drawing, which is incorporated herein and constitute a part of this specification, illustrates an embodiment of the disclosure and, together with the description, serve to explain the principles of the embodiments disclosed herein.

DESCRIPTION OF EXEMPLARY EMBODIMENTS

Figure 1:
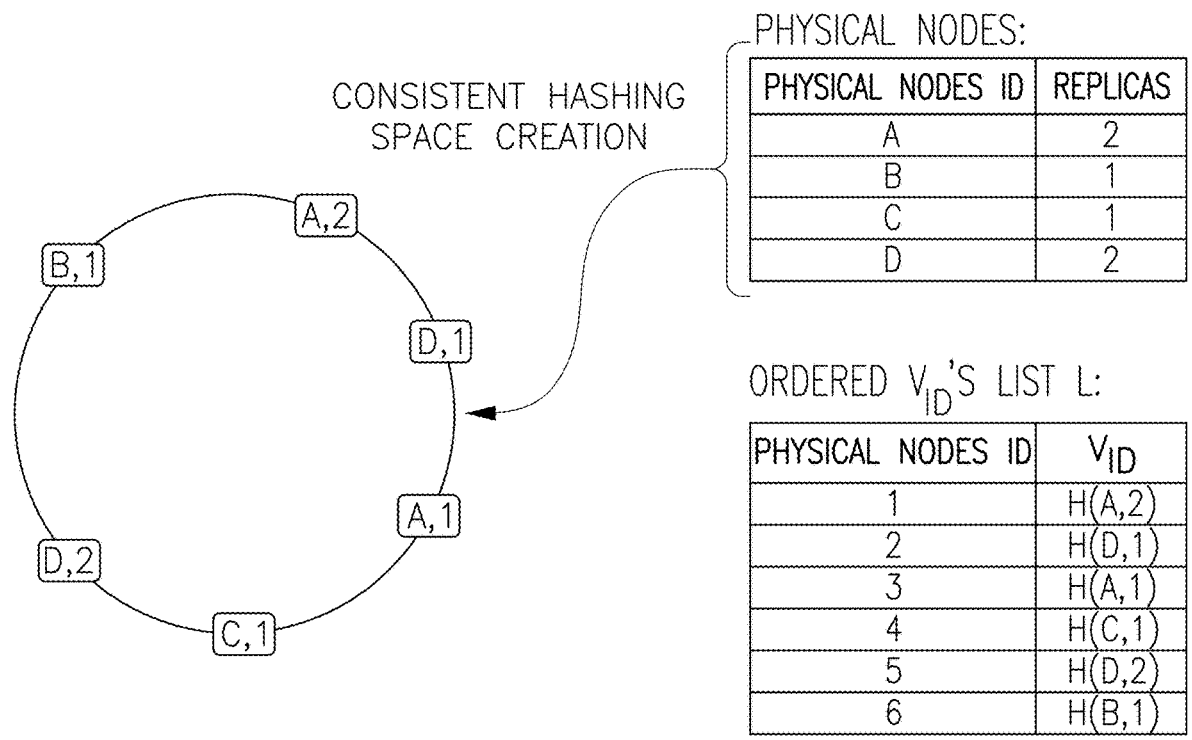
FIG. 1 exemplifies a ring virtual configuration of software consistent hashing space, construed in accordance with an embodiment of the present invention.

Some of the specific details and values in the following detailed description refer to certain examples of the disclosure. However, this description is provided only by way of example and is not intended to limit the scope of the invention in any way. As will be appreciated by those skilled in the art, the claimed distributed routing system may be implemented by using other devices that are known in the art per se. The scope of the invention can be summarized by referring to the appended claims.

With the rise of distributed architectures, consistent hashing became a major player. The term "hashing" refers to a process to map data of arbitrary size to fixed-size values. Hashing has many applications in computer science, such as for example, checksum. In order to verify the integrity of a dataset, a server hashes a dataset and indicates the hash value to a client. Then, the client hashes its version of the dataset and compares the hash values. If the two are equal, the integrity is is likely to be verified (e.g., a problem may arise when two distinct pieces of data have the same hash value (a collision)).

One of the challenges associated with this methodology is spreading the values across a domain. Load distribution is therefore the process of spreading load across network processing units.

The term "network processing unit" as used herein throughout the specification and claims is used to denote any number of the group that comprises a node, a server, a computation unit, and the like. Load balancing is one example of load distribution. It is used in distributing a set of tasks over a set of resources. For example, load balancing may be used to distribute API requests among web server instances.

However, when dealing with data, we the term sharding may be used. A database shard is a horizontal partition of data in a database. A typical example is a database partitioned in three shards where each shard has a subset out of the total data.

Load balancing and sharding share some common challenges. Spreading data evenly is used for example to guarantee that a node is not overloaded compared to the others. In some cases, load balancing and sharding also need to associate tasks or data to the same node.

The principle of mod-n hashing is the following. The load needs to be distributed among the nodes based on key identifiers. Each key is hashed using a hashing function to transform an input into an integer. Then, a modulo based on the number of nodes is performed. If sharding is implemented and data is distributed based on the mod-n strategy, in a case where the number of nodes should be scaled, one would need to perform a rebalancing operation.

Now, if vast numbers (millions or even billions) of data have been stored and it is now required to rebalance a substantial part thereof, the rebalancing should preferably be a process wherein: the distribution remain as uniform as possible based on the new number of nodes, and the number of keys that need to be migrated should be limited. This is the purpose of consistent hashing algorithms, algorithms that maintain the key consistent until a certain point in order to keep the distribution uniform.

A ring consistent hashing algorithm is an algorithm that is based on a ring (an end-to-end connected array), and the first operation is to create the ring. A ring has a fixed-length and it may be partitioned into a predetermined number of partitions, and the network processing units (nodes in this example) are located in these partitions.

In general, a load-balancing device requires a function F(K), which is configured to match a key (e.g., network headers, data-base keys, and the like) with a node ID.

Let us define function F(K) as:

$$F(K): \{K\} \rightarrow \{N\}$$

in which $\{K\}$ is a set of available keys, and $\{N\}$ is the set of active and available nodes.

Most systems use a naïve but very scalable implementation, whereby a hash function (H) is used:

$$F(K)=H(K) \% N$$

In the above equation H is a Hash function which translates any arbitrary key into a number, while N is the number of current active and available nodes. Now, let us assume that H in reality is configured to operate on a known key set, and has a bounded run-time complexity, such that F(K) is considered O(1).

Next, the problem is what happens when N (the number of available and active network processing units, e.g., nodes) changes due to an addition, removal or failure of a network element. In such a case, the problem that arises is that the entire mapping logic which is defined by F, changes. Consequently, a complete traffic shuffling to all destinations occurs, regardless of the fact whether the actual item was originally destined to a changed node (resulting, in many changes within the system, large blast radius and a need to move content between places).

Mathematically the result stems from the use of the modulo operator (%). When the number of nodes N changes to N', $F(K) != F'(K) [(F(K)=H(K) \% N), F'(K)=H(K) \% N']$ for every $H(K)>=N'$.

To mitigate the problem without increasing memory footprint, yet while taking into account different node processing capabilities (in terms of memory, CPU, networking bandwidth and delay, etc.), one may use the function M(K), by implementing the following steps:

1. Creating a virtual node ID for every active and available node, wherein the virtual node ID is defined by: $V_{ID}=H (NODE_{ID}, R)$, in which $NODE_{ID}$ is the physical node ID, and R is the replica number which creates a weight of the number of times that this node should be used in calculations, thereby enabling the use of unequal hashing;

2. Creating an ordered list L of the $V_{ID}$'s (preferably their hash values)

3. When a packet/key needs to be resolved, retrieving function F(K) by taking the following steps:
   1. Calculating the hash value for the key $N_{ID}$=H(K)
   2. Determining the minimal element in L which is larger or equal to $N_{ID}$:
      Actual Node ID=Search (L, $N_{ID}$, [$V_{ID}$>=$N_{ID}$])

The above method can be implemented effectively using a software wherein O($\log_2$N) run-time complexity and O(N) space complexity, using a binary search or tree structures.

This implementation may be regarded as a geometrical representation of a circle, in which points comprised in the circle are the various $V_{ID}$'s. It is no longer sensitive to a change in N, since F(K) does not use the modulo operation. A node addition, removal or failure would mark the relevant $V_{ID}$'s as inactive and the search will return the next available item (in a clockwise direction) resulting in a different resolution for items destined only to it—which simplifies the change and consequently, results on average in only [K/N] items being changed.

FIG. 1 demonstrates an example of the above methodology which depicts a software consistent hashing space creation, construed in accordance with an embodiment of the present invention. The representation depicts four physical nodes designated A, B, C and D and replicas of nodes A and D. This configuration is then used for creating a consistent hashing space. For every active and available node of the six entities depicted in this representation, 1 to 6, a virtual node ID was created ($V_{ID}$), and an ordered list L of the hash values of the $V_{ID}$'s, established.

Figure 2:
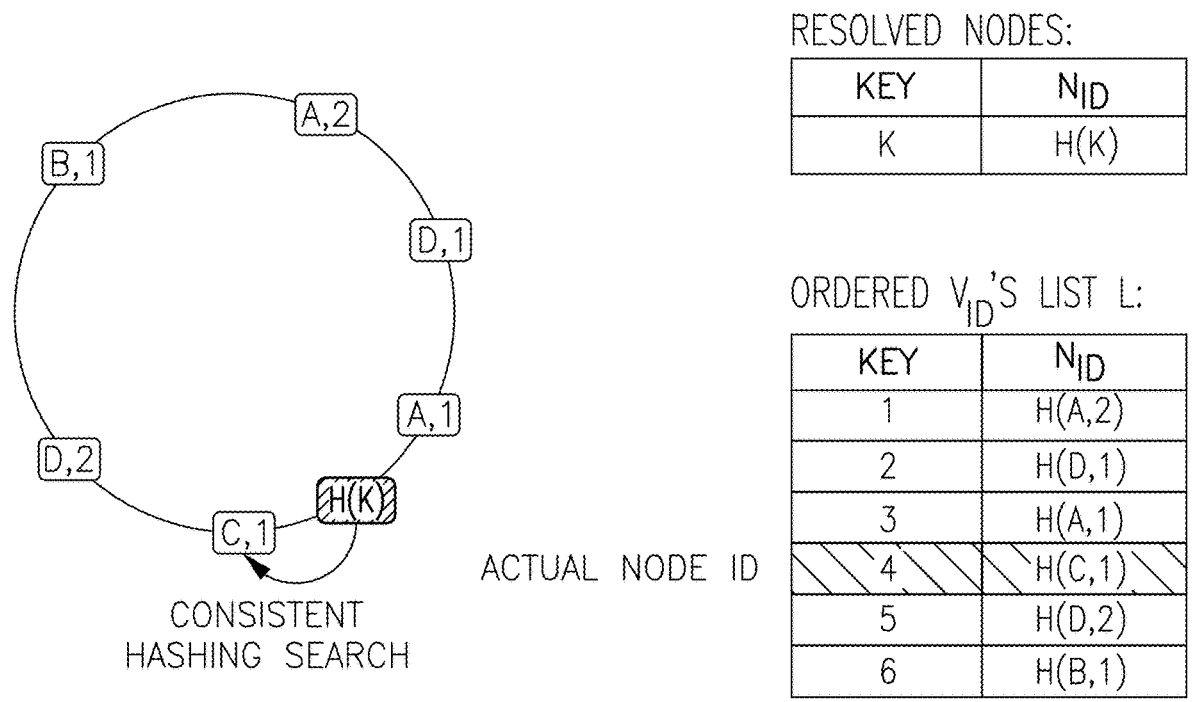
FIG. 2 exemplifies a search resolution for a software consistent hashing using an arbitrary key, for the network exemplified in FIG. 1.

FIG. 2 illustrates the network presented in FIG. 1, wherein an example of a search resolution for a software consistent hashing is depicted, using an arbitrary key K.

Figure 3:
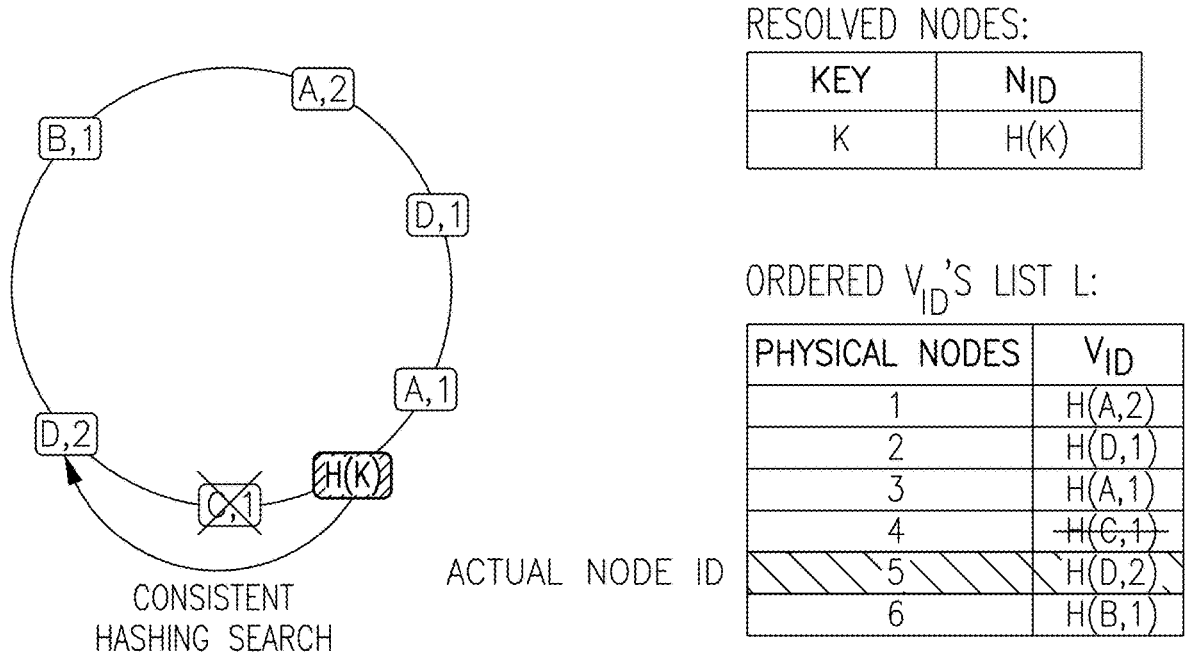
FIG. 3 exemplifies a search resolution for a software consistent hashing using an arbitrary key after a node failure.

FIG. 3 depicts an example of the search resolution for the software consistent hashing on an arbitrary key K shown in FIG. 2, after a failure of the node C,1. Obviously, as would be appreciated by those skilled in the art, such a process as the one in FIGS. 2 and 3, mutates mutandis may be carried out for each of the nodes which experiences a change (addition, removal, multiple failures).

In view of the above, the present invention seeks to provide a solution for additional cases which aim to effectively implement a scalable version of the algorithm using an NPU (Network Processing Unit) so that a single NCP or even clusters of NCPs working together, can operate accordingly. Solving these problems has a number of obvious advantages. To name but few, a better overall scaling (from servers which can handle tens of Gb/s to small 1 hundreds of Gb/s, up to NCPs which can handle 4 Tb's to many hundreds of Tb/s at a line-rate); a better overall space, and power efficiency; a better Search performance (0(1) hardware search); a better overall load-balancing performance (processing packets using hardware); and a better overall failure/change mitigation rate.

In order to reach a solution to the above challenge, the following two issues must be addressed. First, how to represent the consistent hashing space in an NPU, and second, how to implement the Search function in an NPU.

The solution found was implementing a packet forwarding based on searching for the destination ID (the next node) using a key built from the packet's meta-data (mainly the networking headers). Searching is done for that key inside a fast search memory (physical or algorithmic TCAM [a Content Addressable Memory]), resulting in a respective destination ID.

The possible route space is composed of the networking subnets/prefixes (being de-facto an ordered list) while the search function is based on an LPM (Longest Prefix Match). Thus, one of the advantages of the present invention is that it provides a logical linkage between a search for the next closest consistent-hashing ring member and the operation of the Longest Prefix Matching (LPM).

However, in a consistent hashing case, as the case with the problem which this embodiment of the present invention seeks to solve, the solution proposed is to ensure that the same search function (LPM) is preserved, but the space is built differently, namely, by using the possible $V_{ID}$'S as prefixes.

Adopting this approach, allows implementing a general packet-processing mechanism to solve the problem, by achieving all the aforementioned issues without a need to employ any special hardware mechanism. The search of $N_{ID}$ is done immediately by hardware at a line-rate for all possible node ID's.

In order to mitigate a failure, every $V_{ID}$ entry results in a primary (i.e., the node itself) and backup $V_{ID}$ entry. This is handled by using a hardware, similar to implementation of an FRR (Fast Re-Route) mechanisms. Removal or addition of nodes are handled as addition or removal (atomic operations) of nodes in a route. In other words, one may consider the mechanism described hereinabove as a non-trivial use of FRR (fast re-route) mechanism to implement the treatment of node in which a change has occurred. To do that, a primary destination pointer and backup destination pointer are used, and once the primary destination pointer goes down, the backup destination pointer is used to point (i.e., identify) to the next valid member of the ring.

Figure 4:
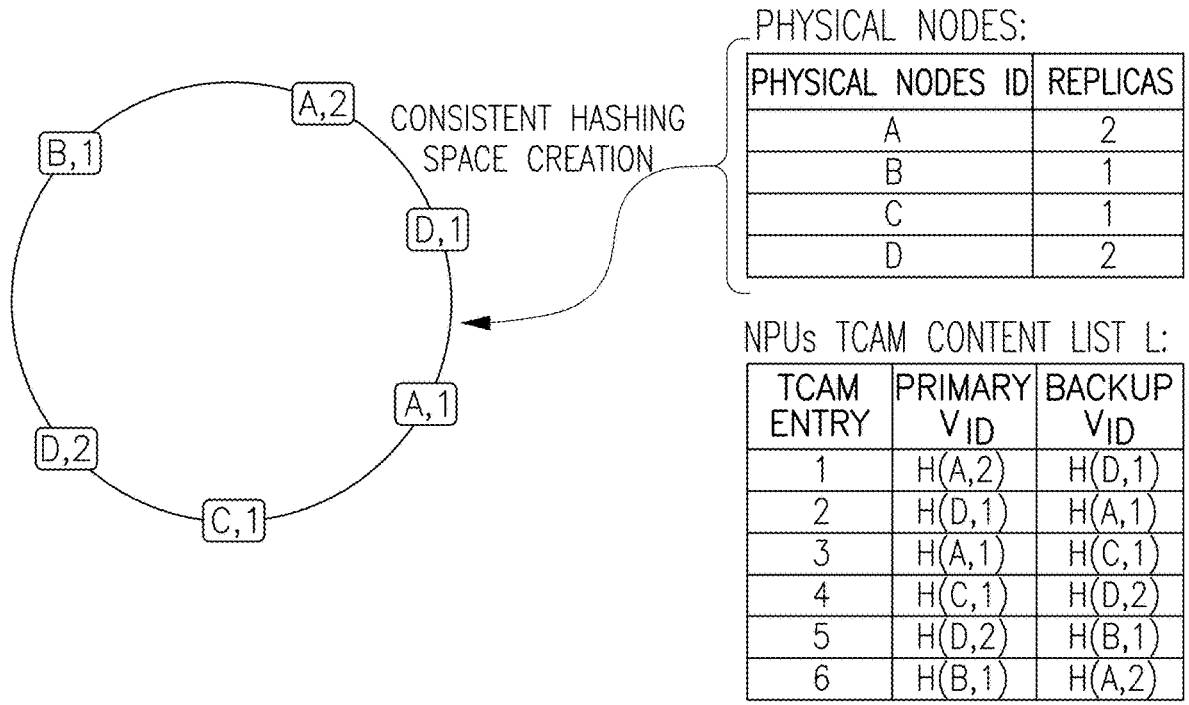
FIG. 4 exemplifies a ring virtual configuration of software consistent hashing space for a network comprising NPUs.

In a way similar to FIG. 1, FIG. 4 demonstrates an example of a network representation of network comprising network processing units (NPUs), for a software consistent hashing space creation, construed in accordance with an embodiment of the present invention. The representation comprises four physical NPUs designated A, B, C and D and respective replicas of NPUs A and D, for creating a consistent hashing space. For every TCAM entry of an NPU/replica depicted in this representation, 1 to 6, a primary virtual node ID and a backup virtual node ID were created ($V_{ID}$). An ordered list L of the hash values of the primary $V_{ID}$'s and the backup $V_{ID}$'s is shown in this figure.

Figure 5:
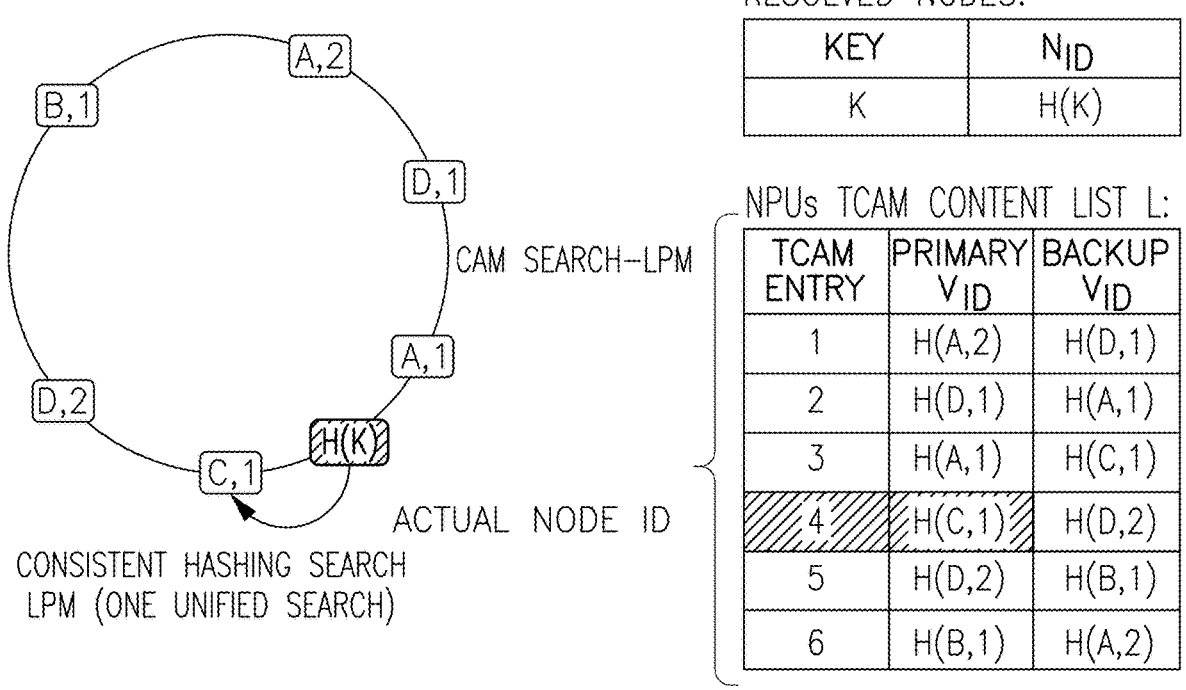
FIG. 5 exemplifies a search resolution for a software consistent hashing using an arbitrary key, for the NPUs network exemplified in FIG. 4.

FIG. 5 illustrates the network presented in FIG. 1, wherein an example of a search resolution for an NPU assisted consistent hashing is depicted, using an arbitrary key K.

Figure 6:
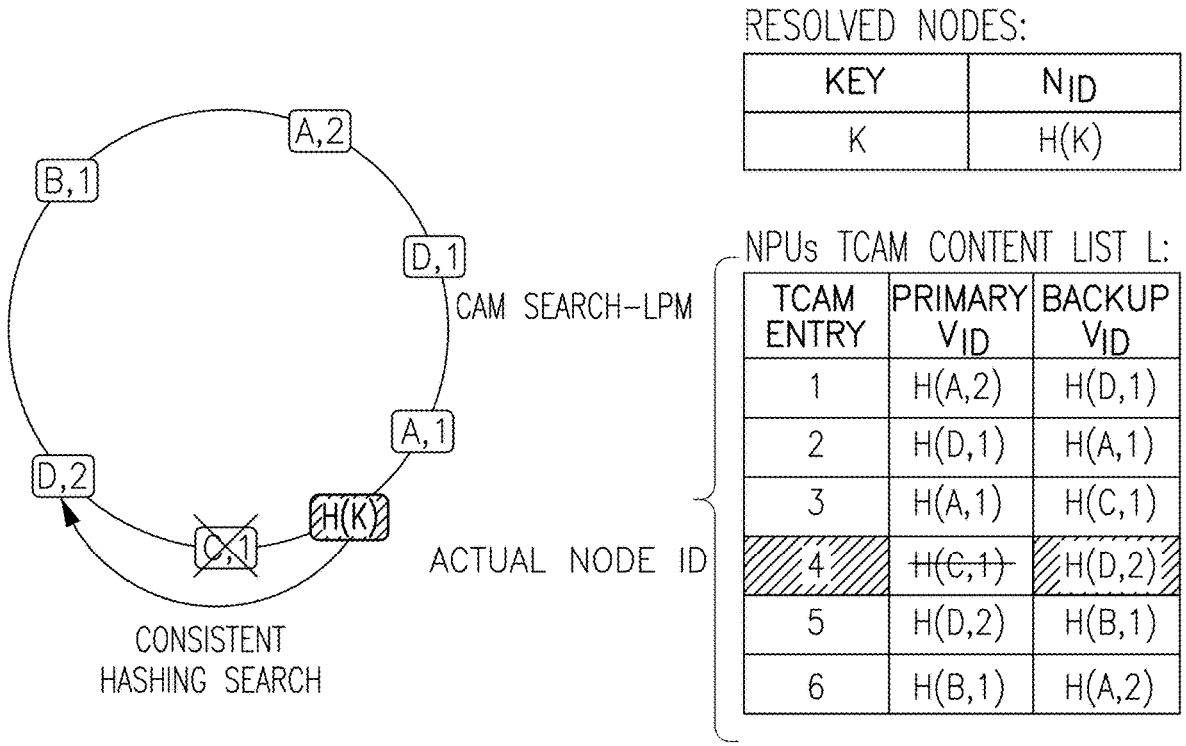
FIG. 6 exemplifies a search resolution for a software consistent hashing using an arbitrary key after an NPU node failure.

FIG. 6 depicts an example of the search resolution for the NPU assisted consistent hashing on an arbitrary key K present in FIG. 5, after a failure of the NPU C,1.

Figure 7:
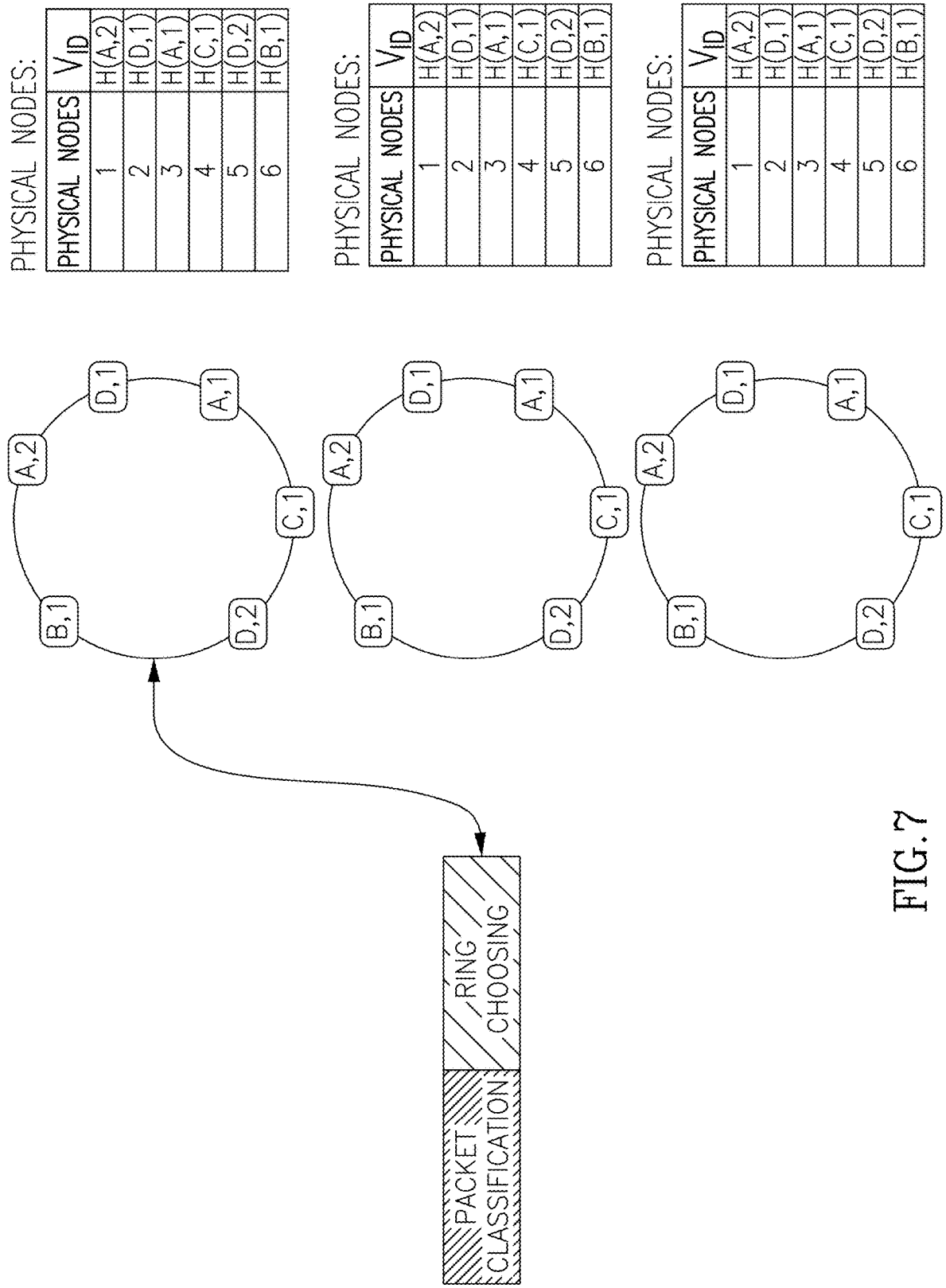
FIG. 7 illustrates a ring virtual configuration of software consistent hashing space of load-balancing groups, construed in accordance with an embodiment of the present invention.

According to another embodiment of the present disclosure illustrated in FIG. 7, the method provided further comprises a step of implementing a plurality of different load-balancing groups as VRF (Virtual Routing and Forwarding) tables, which in turn are used as a parameter while carrying out the LPM algorithm search, thereby creating a dedicated consistent hashing space for use as a route space for conveying traffic in the communication network. The term "load-balancing group" as used herein throughout the specification and claims, is used to denote a set of specific destinations for a certain subset of the keys. Preferably, this is step is carried out by implementing the above-described technique (i.e., generating a consistent hashing ring structure) for each of these load-balancing groups.

Figure 8:
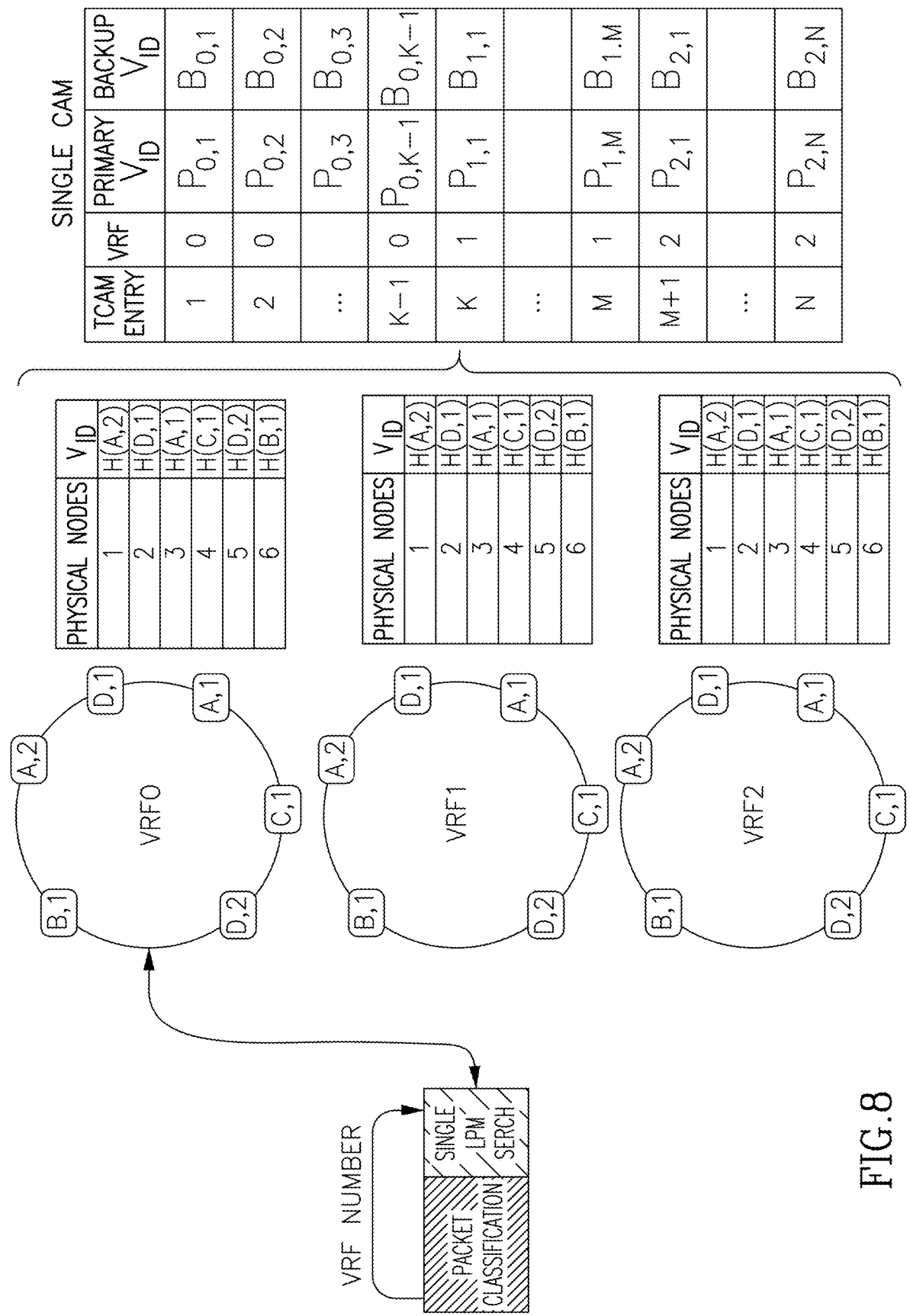
FIG. 8 exemplifies a search resolution for a software consistent hashing after packet classification utilizing different load-balancing groups as VRF (Virtual Routing and Forwarding) tables while carrying out a LPM algorithm search.

FIG. 8 exemplifies a search resolution for a software consistent hashing. After affecting a packet classification, the different load-balancing groups are used as VRF (Virtual Routing and Forwarding) tables while carrying out an LPM algorithm search. The results of the LPM algorithm search are used in creating a dedicated consistent hashing space that in turn may be used as a route space for conveying traffic in the communication network.

One of the advantages of this aspect of the invention is that load-balancing groups are implemented in a software after determining what is the communication packet (i.e., packet classification), and then selecting the appropriate ring and searching thereat. If a packet destination is shared among more than one ring, in case of failure of the node which is the shared destination, all rings will have to be updated regarding the change that took place in order to overcome that node failure (which next hope was selected).

Using the novel NPU's network described hereinabove, the packet classification is carried out by using hardware (HW), and immediately thereafter, while still using the same memory (as the packet classification enables obtaining the respective VRF parameter), the appropriate entry is derived from the suitable VRF/load-balancing group. If a destination NPU that is shared by more than one ring fails, the HW mechanism will update every entry that includes that NPU with the NPU that is the backup NPU for the failing NPU.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for use in a communication network, wherein said method comprises the steps of:
   (i) providing a plurality of network processing units (NPU's) comprised in said communication network;
   (ii) establishing a replication of at least one of said plurality of network processing units;
   (iii) virtually arranging the plurality of network processing units and the at least one replication, in a ring configuration;
   (iv) associating a unique primary virtual identification and a corresponding unique backup virtual identification with each active and available entity selected from among said plurality of network processing units and the at least one replication;
   (v) establishing a list of hash values, each associated with the primary virtual identification or with the backup virtual identification of a corresponding active and available entity;
   (vi) implementing a ring consistent hashing algorithm for carrying out a search resolution for a consistent hashing; and
   (vii) in a case of a change in at least one of the active and available entities having a certain unique primary virtual identification, using the corresponding backup virtual identification to maintain the ring continuity.

2. The method according to claim 1, wherein the search resolution for a consistent hashing is conducted based on searching for a packet destination ID using a key built from said packet's meta-data.

3. The method according to claim 2, wherein packet's meta-data is derived from the packet's networking headers.

4. The method according to claim 2, wherein the search resolution for a consistent hashing is done by retrieving a respective destination ID while using a Ternary Content-Addressable Memory (TCAM) algorithm.

5. The method according to claim 2, wherein further comprising a step of composing a route space of the networking subnets and/or prefixes, and wherein the search function is based on a Longest Prefix Match (LPM) algorithm.

6. The method according to claim 5, wherein the same search function (LPM) is preserved, and the space is built by using possible virtual identifications as prefixes.

7. A method for use in a communication network, wherein said method comprises the steps of:
   (i) providing a plurality of network processing units (NPU's) comprised in said communication network;
   (ii) establishing a replication of at least one of said plurality of network processing units;
   (iii) virtually arranging the plurality of network processing units and the at least one replication, in a ring configuration;
   (iv) associating a unique primary virtual identification and a corresponding unique backup virtual identification with each active and available entity selected from among said plurality of network processing units and the at least one replication;
   (v) establishing a list of hash values, each associated with the primary virtual identification or with the backup virtual identification of a corresponding active and available entity;
   (vi) implementing a ring consistent hashing algorithm for carrying out a search resolution for a consistent hashing; and
   (vii) in a case of a change in at least one of the active and available entities having a certain unique primary virtual identification, using the corresponding backup virtual identification to maintain the ring continuity,
   wherein the search resolution for a consistent hashing is conducted based on searching for a packet destination ID using a key built from said packet's meta-data,
   wherein said method further comprises a step of composing a route space of the networking subnets and/or prefixes, and wherein the search function is based on a Longest Prefix Match (LPM) algorithm, and
   wherein said method further comprises a step of utilizing different load-balancing groups as VRF (Virtual Routing and Forwarding) tables, which in turn are used as parameters while carrying out the LPM algorithm searches, thereby enabling generation of a dedicated consistent hashing space for use as a route space for conveying traffic in the communication network.

* * * * *